(No Model.)  6 Sheets—Sheet 1.

W. T. VALE & G. A. OHL.
BARREL MAKING MACHINE.

No. 531,283.  Patented Dec. 18, 1894.

Witnesses  Inventors (No Model.) 6 Sheets—Sheet 3.
W. T. VALE & G. A. OHL.
BARREL MAKING MACHINE.

No. 531,283. Patented Dec. 18, 1894.

Fig. 3

Witnesses
Fred Clarke
H. N. Neff

Inventors
Wm T. Vale & Geo. A. Ohl
by Ridout & Maybee
Attys (No Model.) 6 Sheets—Sheet 4.

W. T. VALE & G. A. OHL.
BARREL MAKING MACHINE.

No. 531,283. Patented Dec. 18, 1894.

Witnesses
Fred Clarke
A. N. Neff

Inventors
Wm T. Vale & Geo. A. Ohl.
by Ridout & Maybee
Attys (No Model.) 6 Sheets—Sheet 5.

W. T. VALE & G. A. OHL.
BARREL MAKING MACHINE.

No. 531,283. Patented Dec. 18, 1894.

Fig.5

Witnesses
Fred Clarke
A. M. Neff

Inventors
Wm. T. Vale & Geo. A. Ohl.
by Ridout & Maybee
Attys (No Model.)   W. T. VALE & G. A. OHL.   6 Sheets—Sheet 6.
BARREL MAKING MACHINE.

No. 531,283.   Patented Dec. 18, 1894.

Witnesses   Inventors
Fred Clarke   Wm T. Vale & Geo. A. Ohl
   by Ridout & Maybee
   Attys

UNITED STATES PATENT OFFICE.

WILLIAM T. VALE, OF TORONTO, CANADA, AND GEORGE A. OHL, OF NEWARK, NEW JERSEY, ASSIGNORS TO THE VALE BARREL MACHINE COMPANY, LIMITED, OF HAMILTON, CANADA.

BARREL-MAKING MACHINE.

SPECIFICATION forming part of Letters Patent No. 531,283, dated December 18, 1894.

Application filed March 31, 1894. Serial No. 505,923. (No model.)

*To all whom it may concern:*

Be it known that we, WILLIAM THOMAS VALE, of the city of Toronto, in the county of York and Province of Ontario, Canada, and GEORGE ADAM OHL, of the city of Newark, in the State of New Jersey, have jointly invented certain new and useful Improvements in Barrel-Making Machines, of which the following is a specification.

This invention relates to certain new and useful improvements upon the machines shown and described in the United States Patents Nos. 384,730 and 497,105, granted, respectively, June 19, 1888, and May 9, 1893, to William Thomas Vale; and said invention consists in the peculiar construction, arrangement and combinations of parts hereinafter more particularly described and then definitely pointed out in the claims, at the end hereof.

In the accompanying drawings

In the drawings, like letters and numerals of reference indicate corresponding parts in the different figures.

A, is the main driving pulley, which is placed in connection with the shaft B, by means of a clutch C, of any suitable construction. This clutch is operated as indicated by the treadle D. The shaft B, conveys its motion by suitable gearing (see Fig. 1) to the shaft E, of the barrel-former F, the construction of which is hereinafter more particularly described. Surrounding this barrel-former, one at each end and also one at the middle, are three rings composed of movable half rings G, and H, adapted to slide in any suitable manner on the guides I, carried by the bed of the machine. The half rings G, and H, are respectively connected together by the bars J, and K, so that when in operation, their movements are simultaneous. (See Figs. 1, 2 and 3.)

The outer guides I, are adjustable longitudinally on the bed of the machine by means of bolts 46, which pass through slotted brackets 47, connected to these guides. By means of these bolts, the outer guides I, may be clamped at any desired distance apart to suit the length of the barrel being made at that time. The bars J, and K, are also slotted where they are connected to the outer half rings G, and H, so as to admit of this adjustment. (See Figs. 1 and 2.)

L, is a rocking frame having bearings at M, on the bed of the machine. N, N, are bearing boxes sliding on guides formed on the standards of this frame. These bearing boxes carry the feed-roller shaft O, and are adjustable vertically on the frame L, by means of the screw spindles P, operated by means of bevel gearing, as indicated, from a hand-wheel on the spindle Q.

To the shaft O, the feed rollers R, are rigidly connected and the said shaft derives its motion from the shaft E by means of the gear wheel S, which conveys its motion to the pinion T, on the end of the shaft O, by the intermediate adjustable pinions U, and V.

Figure 1:
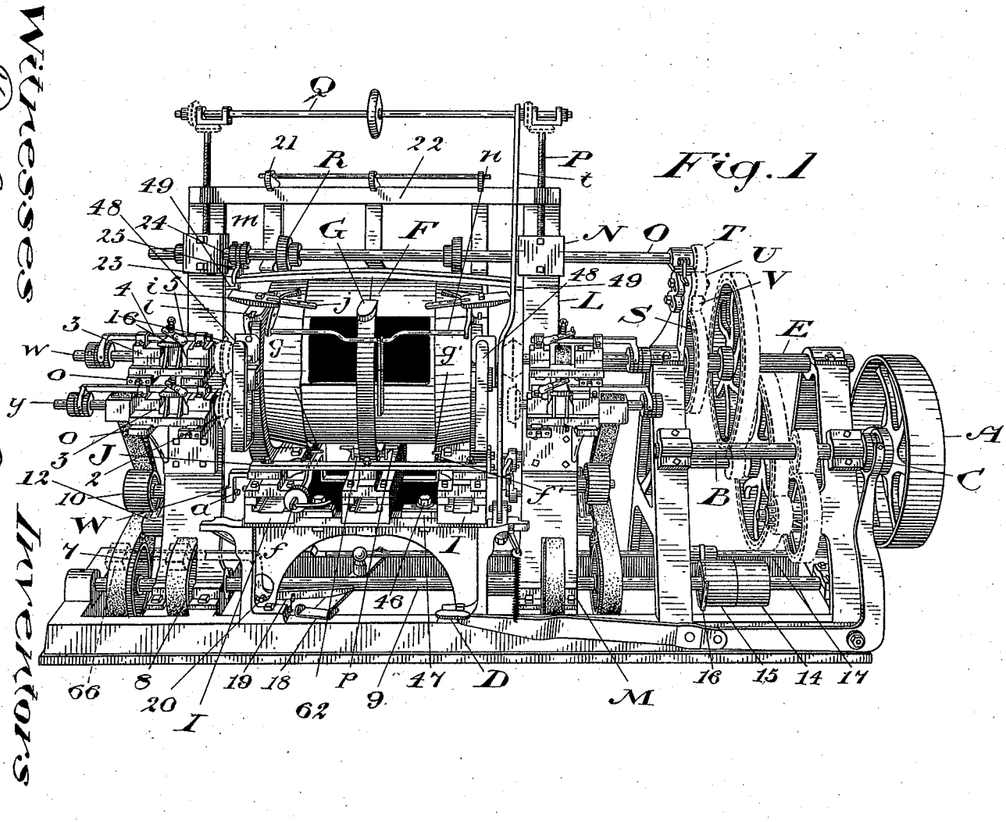
—Figure 1 is a perspective front view of the machine.

It will be observed on reference to Fig. 1, that the spindles on which these pinions are journaled are adjustable in their bearings so that they may be moved so as to mesh properly with the pinion T, when the feed roller shaft O, is adjusted vertically on the frame L, to suit the particular thickness of the stave being used or size of the barrel being made. The bearing on which the outer end of the feed roller shaft rests next to the pinion T, is shown covered by a cap, but this is not essential.

Projecting from each outer half ring G, is a bracket W, having a slot formed in it, into which projects a pin $a$, on the frame L.

A lever $b$, is pivoted on the frame of the machine. One end of this lever is connected to the half ring H, by means of the pivoted link $c$. The lower end of the lever $b$, is connected with the frame L, by means of two pivoted rods $d$ the adjacent ends of which have right and left hand screw-threads respectively formed on the mand are connected by a nut similarly screw-threaded internally. (See Fig. 3.) This nut permits the lengthening or shortening of the connection formed by said nut and the rods $d$, so as to regulate the movement of the adjustable ring H.

A spring $o'$, is connected at one end to the pivot point of the lever $b$, and at its other end to the pin $a$. This spring serves to counterbalance the weight of the frame L, when swung into the position shown in Fig. 2.

It will of course be understood that although a single set of the parts specified is referred to, the set is duplicated at the opposite end of the machine.

In order to securely lock the movable half rings G, and H, a notched bar $f$, is pivoted on one half ring at 60, and a pin $g$, attached to the other. When the half rings are brought together, the pin $g$, enters the notch $l$, in the bar $f$, and securely locks the half rings. (See Figs. 1, 2 and 3.) When it is desired to release the half rings, the end of the bar $f$, is raised and the said half rings are then free to be moved. The outer end of the bar $f$, is provided with an adjustable weight intended to bring the notch $l$, into engagement with the pin $g$. A handle is preferably formed at this end of the bar as shown. The other end of the bar $f$, is preferably connected with a short bar $f'$ pivoted to the half ring G, at the other end of the barrel-former, which bar is thus caused to operate simultaneously with the bar $f$, and engage with a pin $g'$, on the half ring H.

The frame L, is locked in position by the spring-actuated dogs 21 (see Figs. 1, 2 and 3), which are pivoted on vertical extensions of the three half rings H, and engage with the cross-bar 22, of the frame L. These dogs are connected together by a rod, as shown, so that they may be operated simultaneously. The frame is swung and the half rings moved by the action of the lever $t$, which is pivoted to the frame of the machine as shown, and is connected by the pivoted link $u$, to the frame L. (See Fig. 4.)

Figures 2, 9, 10:
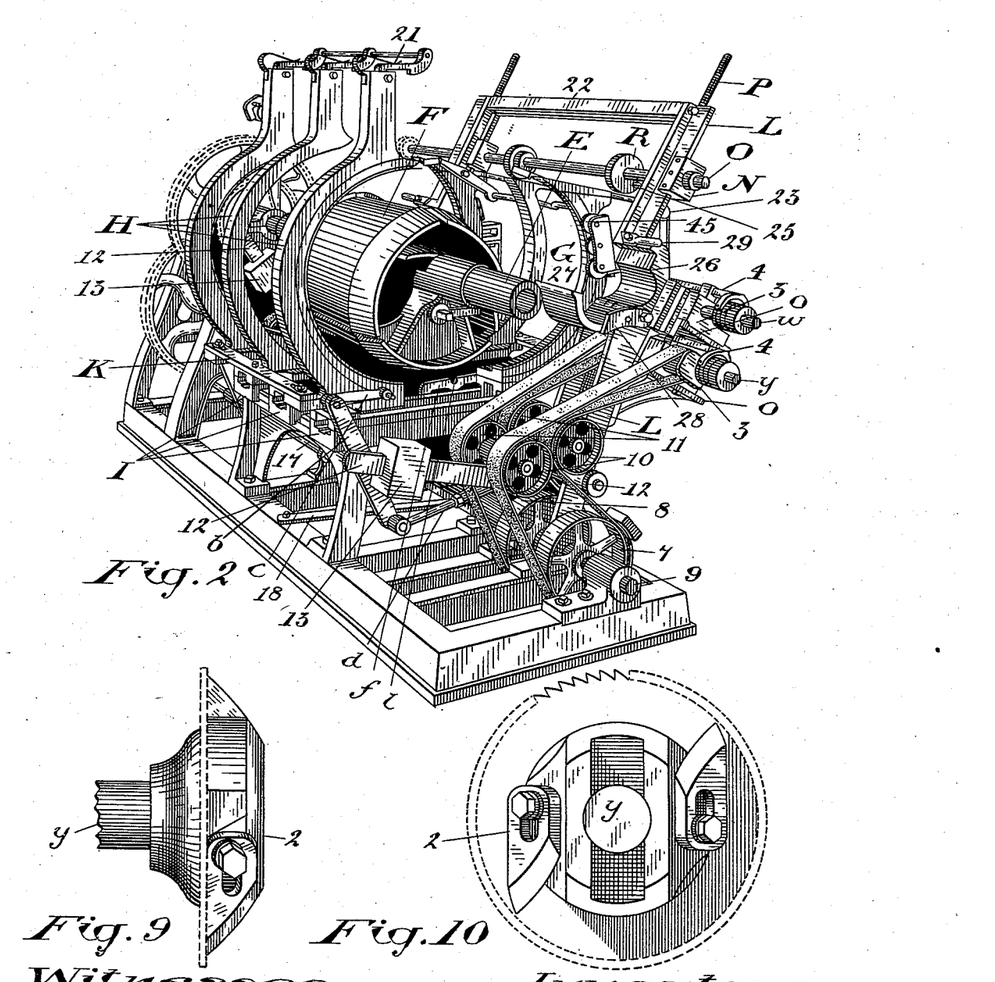
Fig. 2, is a perspective end view of the machine just after the removal of a barrel.
Fig. 9, is a side elevation of the stave equalizing and chamfering cutter-head.
Fig. 10, is an end view of the same.
Figure 3:
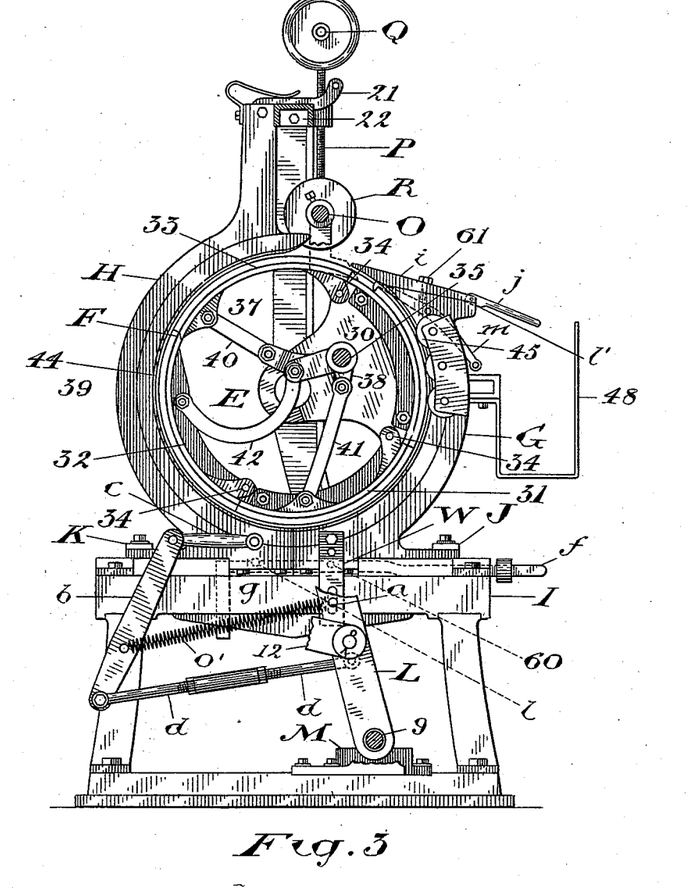
Fig. 3, is an end elevation of the machine with parts broken away so as to exhibit more particularly the collapsible former, the half rings and their connections.

It will be noticed on reference to Figs. 1, 2 and 3 that the upper ends of the outer half rings G, are provided with pivoted lock pieces $i$, pivoted at 61. When these lock pieces are in the position shown in Fig. 1, a sufficient opening is left for the introduction of the staves and when the last stave has been introduced and the lock pieces placed in the position shown in Fig. 3, all the staves will be securely held in position while the barrel-former continues to revolve while the cutter heads are finishing the equalizing, chamfering, hollowing and crozing of the staves, as hereinafter more particularly described. These lock pieces are held in the closed position by means of the pivoted handles $j$, which engage with notches $l'$, in the half rings G, as shown.

Near the upper end of the half rings G, the stops $m$, are pivoted at 63. (See Figs. 1 and 4.) These stops are connected together by a rod $n$, and the upper end of each stop has a hook formed thereon. These hook ends arrest the motion of the first stave put in the machine after it has made the circuit of the frame, and hold the said stave stationary while the other staves are fed in and forced against it. In this way all the staves are forced in close contact with each other.

Beneath the lower side of the barrel former, the stops $p$, are placed. These stops are rigidly connected to a spindle 62, carried by the center half ring G, so that their motion is simultaneous. Pivoted on the half ring C, is a bell-crank lever $q$, connected by the link $r$, to one of the stops $p$, and by the link S, to the rod $n$. (See Fig. 4.)

Figures 4, 11:
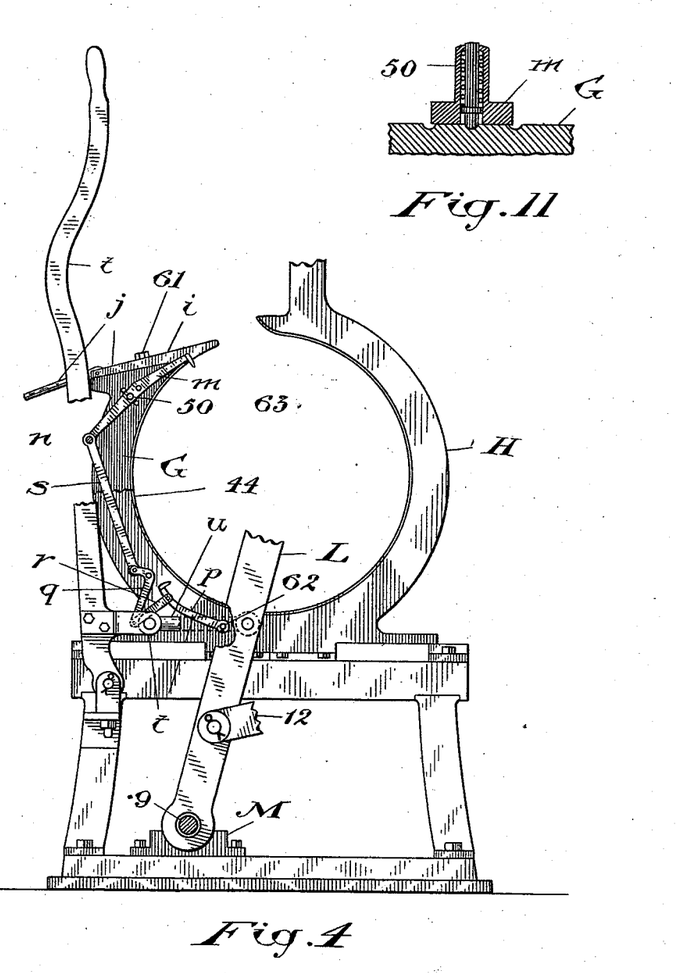
Fig. 4, is a skeleton end view showing the means for operating the movable half rings and also the arrangement of the stops, against which the staves are fed.
Fig. 11, is a sectional detail of the spring lock on the upper stops against which the staves are fed.
Figure 5:
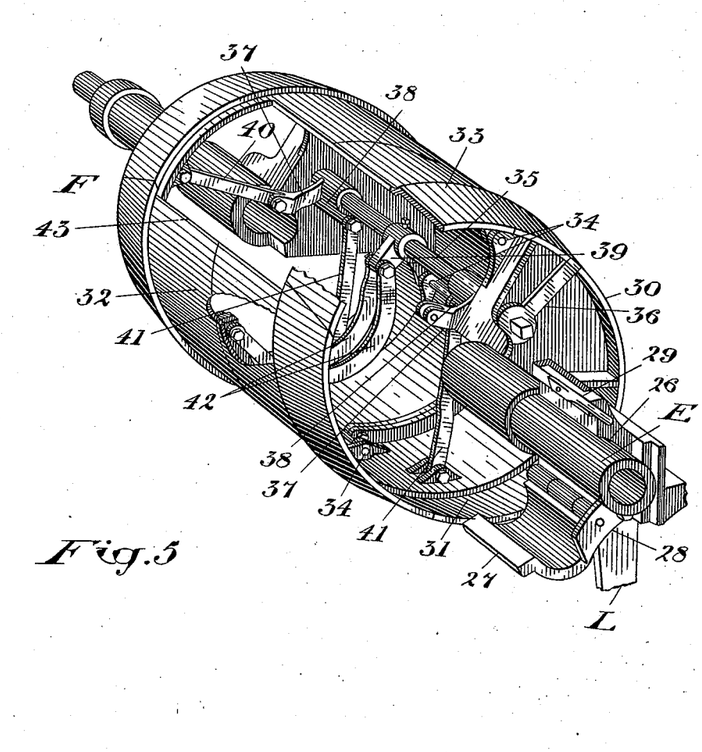
Fig. 5, is a perspective view of the barrel former partially broken away.

All the parts are so connected and proportioned that either the upper or lower stops or neither may be placed in position to engage with the first stave placed in the machine, a spring catch 50, such as shown in Fig. 11, being provided on one or both of the stops $m$, to hold the parts in their several positions.

The particular function of the lower stops is to catch the first stave and insure its being perfectly parallel to the spindle of the barrel former before its ends reach the cutter heads, as hereinafter described.

In Fig. 1, the connection between the upper and lower stops $m$, and $p$, is not shown.

At each end of the barrel former, two independent spindles $w$, and $y$, are journaled on bearings 3, transversely adjustable on guides $o$, carried by the frame L. The spindle $w$, carries the hollowing and crozing cutter head 1, while the spindle $y$, carries the equalizing and chamfering cutter head 2. As the arrangement of each of these spindles is precisely the same, it will be sufficient to describe one of them.

4, is a sliding bar having forks at one end engaging with a ring held between collars fast on the shaft $w$. This bar is moved by a pivoted hand lever 5, which engages with notches on the quadrant 6, which notches are so located as to engage with the hand lever when the cutter head 1 is in position for work or is withdrawn therefrom.

As nothing new is claimed in the bearings and their mode of operation, it is not necessary to specify more particularly the construction or method of transversely adjusting these parts. The construction of the cutter heads themselves is well shown in Figs. 7, 8, 9 and 10. The independent spindles $w$, and $y$, derive their motion as shown from pulleys 7, and 8, on the shaft 9, the belts from these pulleys passing round the tightening pulleys 10 and 11, carried by the pivoted frame 12. The tension on the driving belts is regulated by means of the adjustable weight 13. The shaft 9 is passed through large openings in the frame L (Fig. 4) and is independently driven by a belt from the line shafting to the pulley 14. By making said openings larger than the shaft, the weight of said frame L is not carried by said shaft.

A loose pulley 15, is journaled on the shaft 9, to which pulley the belt is shifted by the belt shifter 16, attached to the sliding rod 17, which rod is operated by the foot lever 18, and slides in suitable bearings on the bed of the machine.

19, is a bent lever pivoted at 20, and carrying at one end brake shoes adapted to engage with the belts on the pulleys 7 and 8, as indicated in dotted lines in Fig. 1. This lever is operated by the foot lever 18, which passes under its curved end as indicated, when the driving belt is thrown off the pulley 14, and thus stops the motion of the cutter spindles $w$, and $y$, by the friction of its brake shoes on the driving belts. When this foot lever 18 is moved so as to pass under the curved end of the lever 19, it will be held there by the wedging action of said curved end against said foot lever 18, and thus will hold the parts in the position in which they have been shifted, until said foot lever is again operated in the opposite direction.

23, is an end stop which is loosely pivoted on the feed roller shaft O, between adjustable collars 24, so that they and the stop 23, can be adjusted longitudinally on the said shaft E, to suit different lengths of staves. To hold this end stop 23 in position, when the staves are being fed into the machine, the back stop 25 is provided, which projects from the frame L and against which the back of the said end stop 23 butts, as shown clearly in Fig. 1. This back stop 25, is connected in any suitable manner to the frame L.

On reference to Figs. 2, 3, 5 and 6, the method of constructing and carrying the barrel former F, will be readily seen. The shaft E, of the barrel former is hollow and is carried in bearing boxes 26, formed on the frame L. Only one of these boxes can be seen in the drawings, but as they are both precisely similar, a description of one will be sufficient.

The cap 27, is hinged and can be thrown open to admit of the rocking of the frame L. A curved piece 28, is connected to the frame L, and is located so as to guide the shaft E, into its proper position in the bearing box 26.

29, is a pivoted lock by means of which the bearing is held closed while the barrel is being formed.

The barrel former is made in four sections—30, 31, 32 and 33, hinged together at 34 as shown. The section 30, of the barrel former is rigidly connected to the shaft E, which does not extend through the barrel former, but is cut away, as shown. The sections 31, and 33 of the barrel former being hinged to the fixed section 30, and the section 32, to the section 31, it follows that these sections may be folded in to take the positions shown in Fig. 6, in which position the barrel former is sufficiently reduced in size to permit of the barrel being removed.

35, is a crank-shaft journaled in the solid ends of the section 30. This crank-shaft has a square end formed on it to which is connected a lock spring 36, engaging with a notch in the edge of the face of the section to hold the spindle in its normal position. From this crank-shaft, crank arms 37, 38 and 39, extend. The crank arms 37, are connected by pivoted links 40, to the section 33. The cranks 38, are connected by the pivoted links 41, with the section 31, and the crank arm 39, is connected by the curved links 42, with the section 32.

Figure 6:
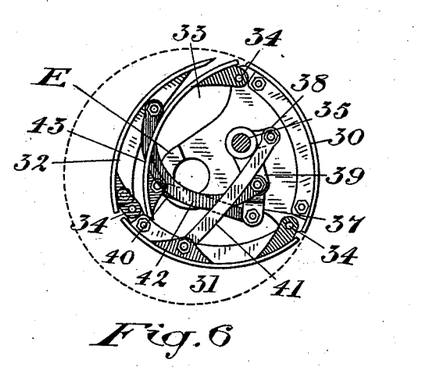
Fig. 6, is an end view partially in section of the barrel former when collapsed.

When it desired to collapse the barrel former, the spring 36, is forced out of the notch in the edge of the barrel former and the spindle revolved by means of a wrench placed on its square end, when the various sections are drawn by the action of the crank arms and links into the position shown in Fig. 6. As the crank arms of the section 33, are longest, this section is necessarily folded in first as indicated.

An opening 43, is made in the section 33, which admits of the curved links 42, passing through it, as shown. In the drawings, these sections of the barrel former F, are shown made of two halves having flanges formed thereon, which are bolted together, but this construction is not essential, nor is it necessary that these sections should be four in number.

It will be noted that three pairs of half rings are used in this machine. The center pair of half rings is very important, as it prevents unequal bulging of the staves at the center, when they are bent round the barrel-former. Each half ring is provided with a liner 44. (See Fig. 3.) A series of these liners of different thicknesses may be provided to suit barrels of different sizes and may be changed at any time according to the diameter of the barrels to be made on the machine at that time. On the outer side of the half rings G, friction rollers 45, are journaled. These take the pressure of the staves when being operated upon by the cutter heads, and may be as many in number as may be desired.

Figures 7, 8, 12:
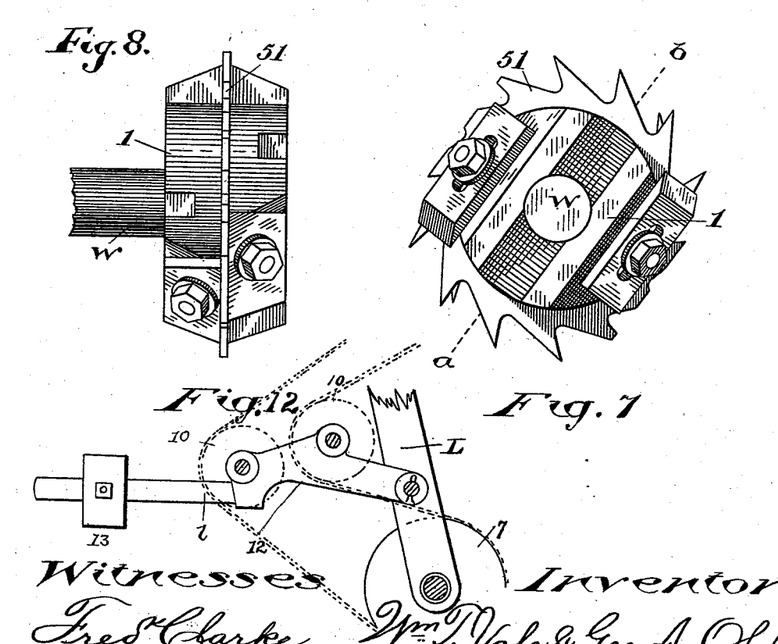
Fig. 7, is an end view of the crozing and hollowing cutter-head.
Fig. 8, is a side elevation of the same directly facing line *a—b*, Fig. 7.
Fig. 12 is an end view of the belt tightening device.

On reference to Fig. 8, it will be seen that the crozing saw 51, has its teeth cut away at opposite sides of the cutter head. This construction permits the saw to be withdrawn when the croze is completed. The ends of the staves are forced inward and into contact with the saw by means of the rollers 45, and unless some such provision as cutting away the teeth were made, it would be impossible to withdraw the saw from the groove in which it lies.

48, are brackets intended to hold the staves which 'are about to be fed into the machine. (See Figs. 1 and 3.)

Having described the construction of the machine, a short description of its operation is now given.

The barrel former and feed rollers are first started in motion by operating the clutch C, by means of the treadle D. The pivoted lock pieces $i$, are then opened. (See Fig. 1.) The rod $n$, is then moved so as to throw the lower stops $p$, in position to engage with the first stave entering the machine. This stave is thus leveled as well as the other staves which are fed in behind it. The independent cutter spindles $w$, and $y$, with their cutter heads are then set in motion by throwing the driving belts onto the pulley 14, by means of the foot lever 18 and belt shifter connected therewith. The lower stops $p$, are then thrown out of action and the upper stops $m$, thrown into position. The rest of the staves are then fed in and then both top and bottom stops $m$, and $p$, are thrown out of engagement with the staves. The pivoted lock pieces are then closed, as seen in Fig. 3, and the barrel former allowed to revolve till the cutter heads 1 and 2, have completed the equalizing, chamfering, hollowing and crozing of the stave ends. The cutters are now stopped by operating the foot lever 18, which throws the driving belt onto the loose pulley 15, and applies the brake shoes 66, of the lever 19, to the driving belts of the cutter spindles. The cutter heads are now removed from the cutting position by means of the hand levers 5. The end stop 23, is then thrown up and the end hoops which have been hanging on the hooks 49, are placed in position on the barrel. The dogs 21 pivoted on the half rings H, are then disengaged from the cross-bar 22, of the frame L. The notched bars $f$, and $f'$, are then disengaged from their respective pins $g$, $g'$, and the bearings of the barrel former shaft and feed roller shaft opened. The frame L, may then be rocked by means of the lever $t$, and the half rings G, and H, thus opened. The barrel former F, is then collapsed as previously described and the barrel removed from the machine, which is now in the position shown in Fig. 2.

What we claim as our invention is—

1. In a barrel machine, a cylindrical barrel-former composed of three or more sections hinged so that they may be folded together, one within the other and one of the sections being fixed and rigidly connected to the barrel former shaft, substantially as and for the purpose specified.

2. In a barrel machine a cylindrical barrel-former composed of three or more sections hinged so that they may be folded together, one within the other and one of the sections being fixed and rigidly connected to the barrel former shaft, in combination with means for holding the said hinged sections in their normal position and for folding them in to their collapsed position, substantially as and for the purpose specified.

3. In a barrel machine, a cylindrical barrel-former composed of three or more sections hinged so that they may be folded together, one within the other and one of the sections being fixed and rigidly connected to the barrel former shaft in combination with a crank shaft journaled on the fixed section and having crank arms formed thereon connected by pivoted links to the said hinged sections, substantially as and for the purpose specified.

4. In a barrel machine, a barrel-former comprising the following elements:—three or more sections hinged so that they may be folded together, one of the sections being fixed and rigidly connected to the barrel former shaft, a crank shaft journaled on the said fixed section; crank arms connected to the said shaft; links pivoted to the said crank arms and to the said hinged sections; and a spring lock connected to the said crank shaft and adapted to engage with a notch formed in the fixed section of the barrel former, substantially as and for the purpose specified.

5. In a barrel machine, the barrel-former F, composed of the fixed section 30, rigidly connected to the shaft E, the sections 31, and 33, hinged to the said section 30, and the section 32, cut away at 43, and hinged to the section 31, in combination with the crank shaft 35; crank arms 37, 38 and 39; pivoted links 40, 41, and 42, the latter being curved as shown; and the spring lock 36, adapted to engage with a notch in the edge of the barrel former, substantially as and for the purpose specified.

6. In a barrel machine, the barrel-former F, carried by a shaft E, permanently journaled at one end of the machine, in combination with the rocking frame L, having a bearing 26, thereon, for the barrel former shaft and provided with a curved guide piece 28, substantially as and for the purpose specified.

7. In a barrel machine, the barrel-former F, carried by a shaft E, permanently journaled at one end of the machine, in combination with the rocking frame L, having bearings 26, thereon, for the barrel former shaft, which bearings are closed by hinged caps 27, provided with suitable locks to hold them closed, the outer standard of the frame having a curved guide-piece 28, connected thereto, substantially as and for the purpose specified.

8. In a barrel machine, center half rings G and H, and a stop $m$ arranged to hold the staves in position therein, in combination with a spindle journaled in one of said half rings, and stops $p$ connected with said spindle and constructed to arrange said staves parallel to each other so as to be caught and held by the stop $m$, substantially as described.

9. In a barrel machine, the upper stops $m$, pivoted on the half rings G, and connected together by the rod $n$, in combination with the lower stops $p$, pivoted on one of the half rings G, and operated from the rod $n$, by means of the link $r$, bell-crank lever $q$, and link $s$, substantially as and for the purpose specified.

10. In a barrel machine, the upper stops $m$, pivoted on the half rings G, and connected together by the rods $n$, in combination with the lower stops $p$, pivoted on one of the half rings G, and operated from the rod $n$, by means of the link $r$, bell-crank $q$, and link $s$, one or both of the upper stops $m$, being provided with a spring catch, substantially as and for the purpose specified.

11. In a barrel machine, the half rings G and H arranged when closed to leave a gap at their upper ends for the entrance of staves, in combination with a pivoted lock-piece $i$ pivoted on one of said half rings and arranged to swing around and cover the gap between said two half rings, lock-handles $j$ pivotally secured to said lock-pieces and arranged to lock the latter across the gap by fitting in notches in one of the half rings, substantially as described.

12. In a barrel machine, the rocking frame L, having a bearing M, on the bed of the machine, an opening being provided in the lower end of the rocking frame L, through which the shaft 9, passes without touching said rocking frame, substantially as and for the purpose specified.

13. In a barrel machine, belt pulleys 7 and 8, a pivoted lever 19 having one end curved, brake shoes attached near the other end of said lever, and arranged to act on the belts on said pulleys, and a foot lever arranged to swing under the curved end of said lever 19, and engage forcibly therewith thereby operating said lever to bring the brake shoes in contact with the belts on said pulleys, and to hold the lever 19 in the position in which it is shifted, substantially as described.

14. In a barrel machine, belt pulleys 7 and 8, a pivoted lever 19 having brake shoes attached thereto adapted to engage with the belts on said pulleys, in combination with pulleys 14 and 15, a belt for said pulleys and a belt shifter for said belt, a sliding rod 17 arranged when moved to operate said belt shifter, and a pivoted foot lever 18 having one end connected with said sliding rod 17 and its other end arranged to contact with the pivoted lever 19 and engage forciby therewith, thus holding the same in the position to which it is shifted whereby, when said foot lever 18 is operated, the belt shifter shifts the belt on the pulleys 14 and 15 and also applies the brake shoes on said pulleys 7 and 8, thus stopping these parts of the machine, substantially as and for the purpose specified.

Newark, New Jersey, March 19, 1894.

WILLIAM T. VALE.
GEORGE A. OHL.

In presence of—
FREDK. C. FRAENTZEL,
A. R. CARMICHAEL.